O. DHOOGE.
FISHING TOOL FOR OIL WELLS.
APPLICATION FILED FEB. 15, 1921.
1,405,976.
Patented Feb. 7, 1922.
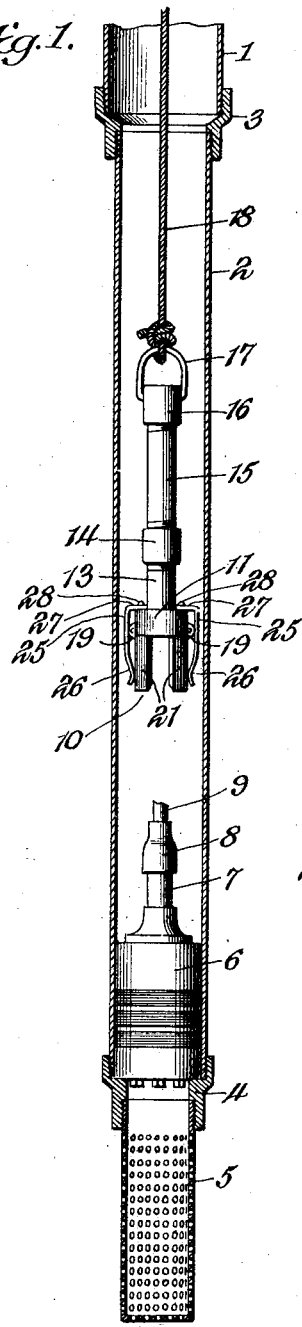
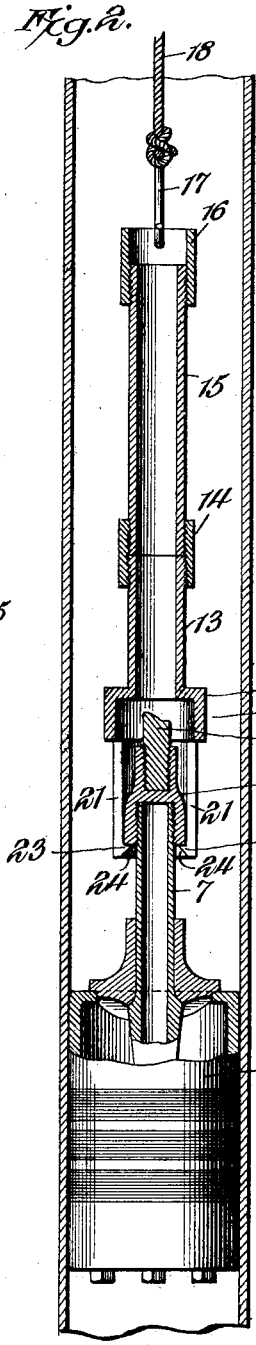
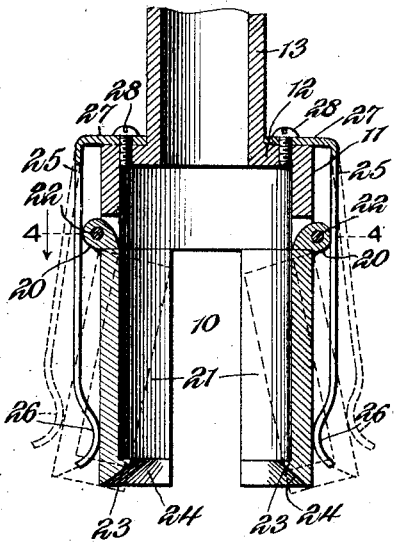
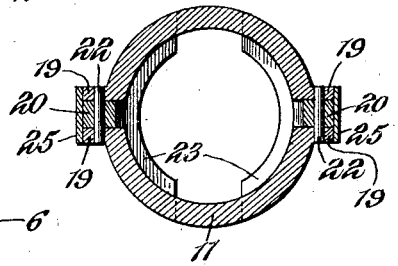
WITNESSES
Howard D. Orr
H. T. Chapman
Oscar Dhooge,
INVENTOR,
BY
E. G. Siggers
ATTORNEY

UNITED STATES PATENT OFFICE.

OSCAR DHOOGE, OF CHICAGO, ILLINOIS.

FISHING TOOL FOR OIL WELLS.

1,405,976.　　　　　Specification of Letters Patent.　　Patented Feb. 7, 1922.

Application filed February 15, 1921. Serial No. 445,166.

*To all whom it may concern:*

Be it known that I, OSCAR DHOOGE, a citizen of the United States, residing at Chicago, in the county of Cook and State of Illinois, have invented new and useful Improvements in Fishing Tools for Oil Wells, of which the following is a specification.

This invention has reference to fishing tools for oil wells and is designed especially to permit the recovery of the lower piston of a double-acting pump, the piston rod of which often breaks above the lower piston at a point between the two pistons, and with fishing tools as heretofore proposed is a difficult, tedious and time-consuming operation, frequently requiring the pulling of the pump casing with attendant disadvantages.

There are types of oil well pumps employing double-acting reciprocating pistons, of which the lower one is carried by a solid pump rod, while the upper one is carried by a hollow piston rod, through which the solid rod extends. The solid or lower piston rod is connected to the lower piston itself by means of a coupling and it at times occurs that the solid rod will break closely adjacent to the lower piston.

With the facilities preceding this invention, it was necessary to take out the working barrel from the well, this requiring the services of about eight men for five days, more or less, in taking out and replacing the pump barrel. With the invention available, the lower piston may be removed without the necessity of taking out the pump barrel and can be replaced in but a small fraction of the time hertofore found necessary for the purpose and such operation can be performed by a single person, thus greatly reducing the time of again putting the well into service to an almost negligible amount.

The invention comprises a fishing tool head with opposed pivoted jaws held in approached position by outwardly yieldable springs, and the jaws have inturned teeth proportionately bevelled so that when the fishing tool is lowered sufficiently to meet the break in the inner pump rod, the broken end will enter the fishing head with the bevelled teeth spreading apart so as to pass the broken off coupling and snap together about the lower end of the coupling, thus anchoring the head to the lower piston, the upper piston having already been withdrawn from the well. The attachment of the fishing head to the broken rod is automatic and the action is such that the fishing head becomes attached to the lower piston against possibility of detachment, whereupon the lower piston may be lifted to the surface of the ground and a new piston rod may then be applied and lowered into the well, after which the upper piston may be properly inserted into the well and the pumping may proceed, the whole operation requiring but a relatively short time, so that the length of time during which the well is out of service is measured by hours rather than days.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Figure 1 is a longitudinal section of an oil well containing the lower piston with its broken piston rod, and showing the fishing tool about to be engaged with the broken piston rod.

Fig. 2 is a similar section on a somewhat larger scale showing the broken piston rod engaged by the fishing tool and being lifted.

Fig. 3 is a longitudinal section showing the fishing tool alone and in solid and dotted lines illustrating the action of the fishing jaws or teeth.

Fig. 4 is a section on the line 4—4 of Fig. 3.

Referring to the drawing, there is shown a well tube 1 carrying at its lower end a pump barrel 2 by means of a coupling 3. At the lower end of the pump barrel 2, it has applied thereto a coupling 4 in turn carrying a strainer 5. The parts already described may be the same as those usually employed in oil wells and, therefore, require no special or extended description.

The pistons of the pump need not differ from those in common use and, therefore, but one piston 6 is illustrated, although it is to be understood that the invention has special reference to double-acting pumps, although the piston 6 represents the lower piston of a double-acting pump and is shown as provided with a short length 7 of piston rod connected by a coupling 8 with another length 9 of piston rod, which may be in the form of a solid rod continued in numerous coupled lengths to the surface of the ground, where it is assumed to be connected with a suitable pumping head, which, however, is not illustrated in the drawings, since it has no relation to the invention. For the same reason, the upper piston and the hollow piston rod through which the solid rod extends is not shown in the drawings.

When the piston rod of the lower piston breaks, the lower piston naturally gravitates to the bottom of the pump barrel 2 and the upper piston may then be readily withdrawn from the well, which operation is performed to eliminate the upper piston and permit access to the lower piston. When the well has been cleared of the upper piston, which is readily accomplished because the pump barrel is of appropriate size to permit the withdrawal of both pistons, the fishing tool of the invention is lowered into the well until within reach of the lower piston, which in the meantime has gravitated to the bottom of the pump barrel and there rests.

The fishing tool is provided with a fishing head 10, comprising a cylindrical member 11 with an upper end 12, terminating in a tubular extension 13 rising from the upper end for an appropriate distance. The extension 13 is connected by a coupling 14 to a pipe 15 carried by a collar 16, which may be screwed onto the upper end of the pipe 15 and the collar 16 is provided with a bail 17 for the attachment of a rope or cable 18, by means of which the fishing tool is manipulated. The cable 18 is assumed to extend to the surface of the ground, where it is connected to any appropriate hoisting mechanism. The cylindrical head or member 11 is provided on opposite sides with matching spaced ears 19, in which are inserted other ears 20 on opposed jaws 21, the ears 19 and 20 being traversed by pintles 22, whereby the jaws are hinged to the head 11. The jaws 21 conform to the curvature of the head 11 for a part of the circumference of the head 11, but the jaws may be separated for an appropriate distance so as to each include considerably less than half the circumference of the fishing head and it is to be understood that the fishing head may include either two jaws as shown, or more than two jaws, by an appropriate limitation of the size, circumferentially, of the jaws.

Each jaw 21 is provided at the lower end with an inturned tooth or flange 23 having the lower edge 24 bevelled toward the longitudinal axis of the head, so that when the fishing head is lowered to the coupling 8, the bevelled edges 24 will engage the coupling 8 and the weight of the fishing head will cause the jaws to expand, because of the bevelled edges 24, until they pass over the coupling 8 and snap toward each other again, wherefore the teeth or flanges 23 will underride the coupling and automatically lock thereto, whereupon a lifting impulse being given to the rope 18, the piston 6 is constrained to follow and may be lifted from the well without difficulty.

The pintles 22 are so related to the upper edges of the jaws 21 that these jaws will only close together to a predetermined extent but may separate about the pintles 22 to a considerably greater extent. The jaws are constrained toward their innermost position by springs 25, which may be simply leaf springs with a free end 26 bent or curved so as to yield readily to the outward movement of the jaws, while the upper ends of the jaws are bent toward the head 11, as shown at 27, and there made fast by screws 28 or by other fastening means. In Fig. 3, the normal position of the jaws 21 is shown in solid lines, while the expanded position of the jaws and the yielding of the springs is indicated in dotted lines.

What is claimed is:—

1. A fishing tool for oil wells, comprising a cylindrical head with an extension for the attachment of a manipulating rope or strand, opposed jaws hinged to the head at the end thereof remote from the extension with said jaws terminating in inwardly extending flanges to receive and embrace the pump rod coupling, and outwardly yielding springs fast to the head and bearing against the outer faces of the jaws.

2. A fishing tool for oil wells, comprising a head with carrying means therefor, opposed jaws hinged to the head in depending relation thereto and terminating in inturned lower ends bevelled to yield to the lowering of the jaws over a coupling of a pump piston, and leaf springs fast to the fishing head and bearing against the jaws, said jaws having a limited approaching movement and the spring yielding to forces tending to separate the jaws.

3. A fishing tool for oil wells, comprising a cylindrical head with hollow stem extending axially therefrom and provided at the end remote from the head with a bail for the attachment of a supporting rope, opposed jaws pivoted to the head and normally separated sufficiently to move over a piston rod coupling with the jaws having inturned flanges spaced to slip over and snap under the coupling, and springs exterior to the jaws and carried by the head for maintaining the jaws in an approached position and yieldable to permit the separation of the jaws sufficiently to admit the entrance of the pump rod coupling into the fishing tool head.

In testimony that I claim the foregoing as my own, I have hereto affixed my signature.

OSCAR DHOOGE.